United States Patent
Jung

(10) Patent No.: US 8,890,918 B2
(45) Date of Patent: Nov. 18, 2014

(54) MOBILE TERMINAL FOR SELECTIVELY STORING VIDEO CALL DATA AND VIDEO CALL DATA STORING METHOD THEREFOR

(75) Inventor: Won-Suk Jung, Ansan-si (KR)

(73) Assignee: Samsung Electronics Co., Ltd (KR)

( * ) Notice: Subject to any disclaimer, the term of this patent is extended or adjusted under 35 U.S.C. 154(b) by 1796 days.

(21) Appl. No.: 11/412,854

(22) Filed: Apr. 27, 2006

(65) Prior Publication Data

US 2006/0244814 A1    Nov. 2, 2006

(30) Foreign Application Priority Data

Apr. 27, 2005   (KR) .................. 10-2005-0034824

(51) Int. Cl.
*H04N 7/14* (2006.01)
*H04N 5/44* (2011.01)
*H04N 5/38* (2006.01)

(52) U.S. Cl.
CPC .............. *H04N 5/44* (2013.01); *H04N 7/147* (2013.01); *H04N 5/38* (2013.01)
USPC ....................................... 348/14.01; 709/204

(58) Field of Classification Search
USPC .............................. 348/14.01–14.08; 455/416
See application file for complete search history.

(56) References Cited

U.S. PATENT DOCUMENTS

| | | | | |
|---|---|---|---|---|
| 5,696,868 A * | 12/1997 | Kim et al. | ...................... | 386/343 |
| 5,729,282 A | 3/1998 | Okawa | | |
| 5,796,440 A * | 8/1998 | Rupinski et al. | .............. | 348/476 |
| 5,841,977 A * | 11/1998 | Ishizaki et al. | ................ | 709/204 |
| 6,621,514 B1 * | 9/2003 | Hamilton | .................... | 348/14.09 |
| 2002/0093521 A1 * | 7/2002 | Daly et al. | .................... | 345/698 |
| 2002/0093531 A1 * | 7/2002 | Barile | ............................. | 345/753 |
| 2004/0055011 A1 | 3/2004 | Bae et al. | | |
| 2004/0185878 A1 | 9/2004 | Woo | | |
| 2005/0041739 A1 * | 2/2005 | Li et al. | .................... | 375/240.12 |
| 2007/0039025 A1 * | 2/2007 | Kraft et al. | ................. | 348/14.01 |
| 2007/0195158 A1 * | 8/2007 | Kies | ........................... | 348/14.01 |
| 2008/0309748 A1 * | 12/2008 | Franceschini et al. | ..... | 348/14.01 |

FOREIGN PATENT DOCUMENTS

EP     1211899    6/2002
JP     2003009104    1/2003

* cited by examiner

*Primary Examiner* — Maria El-Zoobi
(74) *Attorney, Agent, or Firm* — The Farrell Law Firm, P.C.

(57) ABSTRACT

A mobile terminal for selectively storing video call data and a video call data storing method therefore are provided. In the mobile terminal, a controller controls separation of video call data into audio and video data and storing of at least one of the audio and video data in a memory, and the memory stores at least one of the audio and video data under the control of the controller.

21 Claims, 8 Drawing Sheets

US 8,890,918 B2

MOBILE TERMINAL FOR SELECTIVELY STORING VIDEO CALL DATA AND VIDEO CALL DATA STORING METHOD THEREFOR

PRIORITY

This application claims priority under 35 U.S.C. §119 to an application entitled "Mobile Terminal For Selectively Storing Video Call Data And Video Call Data Storing Method Therefor" filed in the Korean Intellectual Property Office on Apr. 27, 2005 and assigned Serial No. 2005-34824, the contents of which are incorporated herein by reference.

BACKGROUND OF THE INVENTION

1. Field of the Invention

The present invention relates generally to a video call-enabled mobile terminal, and in particular, to a video call-enabled mobile terminal having a controller for controlling separation of video call data into audio data and video data and storing of at least one of audio data and video data in a memory, and the memory for storing the at least one of audio data and video data under the control of the controller.

2. Description of the Related Art

Compared to an image file played through a media player, a video call is made based on the multimedia communication standard H.324 protocol in a mobile communication environment. H.324 will be described below with reference to FIG. 1.

FIG. 1 illustrates the protocol architecture of the multimedia communication standard, H.324. Referring to FIG. 1, an H.324 stack 100 includes an H.263/H.261 video coder-decoder (CODEC) 110, a G.723.1 audio CODEC 112, a receive path delay 114, V.14/LAPM data protocols 116, an H.245 control protocol 118, a multiplexer/demultiplexer 120, and a V.24/V.28 modem 122.

According to the H.324 standard, individual audio and video signals are transmitted in one file at a transmitting side and the audio and video signals are separated from the received video call data and then output at a receiving side. A more detailed description of H.324 will not be provided herein.

Since the H.324 video call is a one-time-only activity, the audio and video data involved in the video call are volatile and thus unavailable for further use when the call is over. This problem can be overcome by storing the video call, but the data storage is restricted to audio and video data in combination, not separately.

An H.324 device, especially an H.324 mobile video phone, transmits audio and video signals in combination due to limited system resources, for example, in storage space. In reception, it separates audio and video signals from a received signal and outputs them in synchronization.

This mobile video phone does not allow a user to store audio or video data selectively when needed and thus storing the audio and video data together results in an undesirable consumption of memory resources.

SUMMARY OF THE INVENTION

An object of the present invention is to substantially solve at least the above problems and disadvantages and to provide at least the advantages below. Accordingly, an object of the present invention is to provide a video call-enabled mobile terminal for selectively storing audio or video data during a video call, to thereby save memory resources. Another object of the present invention is to provide a video call-enabled mobile terminal for transmitting stored audio or video data.

The above objects are achieved by providing a mobile terminal for selectively storing video call data and a video call data storing method therefore.

According to one aspect of the present invention, in a video call-enabled mobile terminal, a controller controls separation of video call data into audio and video data and storing of the at least one of audio and video data in a memory, and the memory stores the at least one of audio and video data under the control of the controller.

According to another aspect of the present invention, in a method of selectively storing the at least one of audio and video data in a video call-enabled mobile terminal, video call data is received, and separated into audio and video data. The audio and video data is selected, and stored separately.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In the following description of the present invention, video call data is defined as audio and video data involved in a video call, and image data is defined as an image captured among video data.

Figure 1:
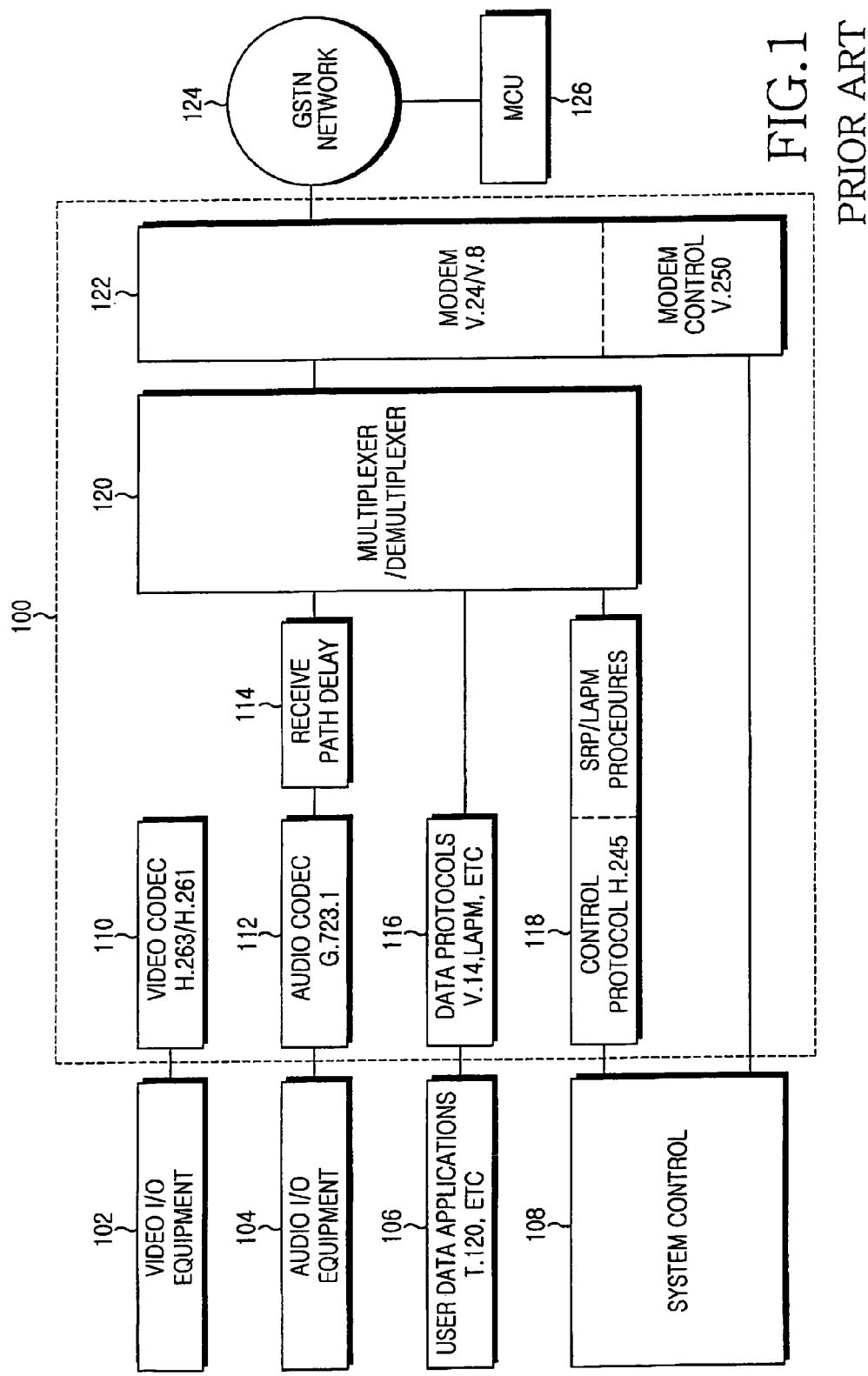
FIG. 1 illustrates the protocol architecture of a multimedia communication standard, H.324.
Figure 2:
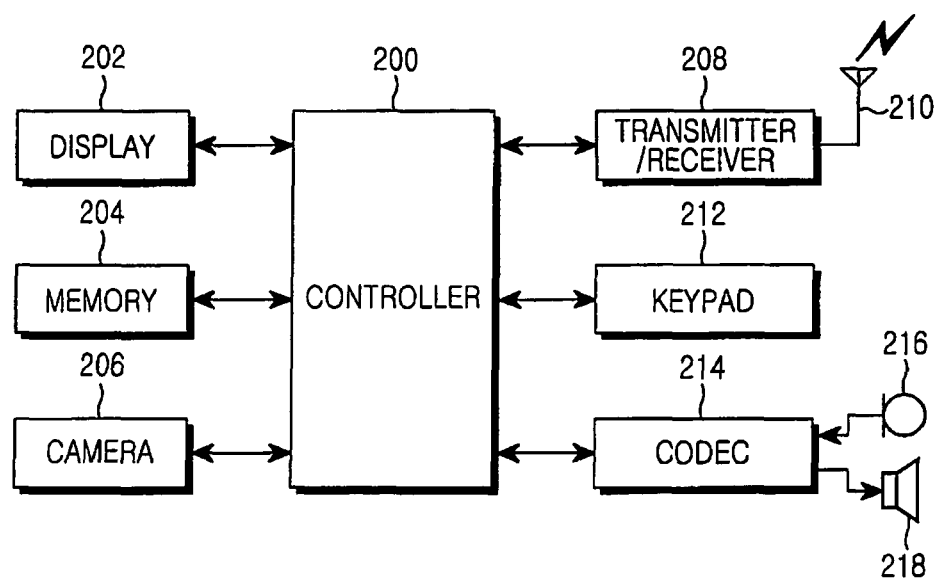
FIG. 2 is a block diagram of a video call-enabled mobile terminal according to an embodiment of the present invention.

The configuration of a video call-enabled mobile terminal according to the present invention will be described below. FIG. 2 is a block diagram of a video call-enabled mobile terminal according to an embodiment of the present invention. Referring to FIG. 2, the video call-enabled mobile terminal includes a controller 200, a display 202, a memory 204, a camera 206, a transmitter/receiver 208, an antenna 210, a keypad 212, a CODEC 214, a microphone 216, and a speaker 218.

The controller 200 provides overall control to the operation of the video call-enabled mobile terminal. For example, it is responsible for the whole processing and control of video calls, including separation of video call data into audio and video data and output of the audio and video data to the display 202 and the speaker 216. Besides the basic functionality, the controller 200 controls selection of audio and video data and storing of the individual selected data in the memory 204 according to the present invention. The controller 200 controls storing of a desired image captured during a video call as image data. The typical processing and control operation of the controller 200 will not be described herein.

The display 202 displays state information or state indicators produced during the operation of the terminal, limited digits and characters, moving pictures, and still images. A liquid crystal display (LCD) can be used as the display 202.

The memory 204 stores programs needed to control the whole operation of the video call-enabled mobile terminal, temporarily stores data generated during the operation, and stores data to be kept such as a phone book, short message service (SMS) messages, and video data. In addition to the traditional functionality, the memory 204 stores data selected among outgoing audio and video data and incoming audio and video data, separately or as one combined data structure. It also stores incoming and outgoing image data.

The camera 206 captures images of a user during a video call and outputs the images to the controller 200 to be displayed on the display 202.

The transmitter/receiver 208 downconverts a radio frequency (RF) signal received through an antenna 210 to a baseband signal and despreads and channel-decodes the baseband signal during a reception operation. During a transmission operation, the transmitter/receiver 208 channel-encodes and spreads transmission data, upconverts the baseband signal to an RF signal, and transmits the RF signal through the antenna 210. The transmitter/receiver 208 also receives the identifier (ID) of a base station on a pilot channel.

The keypad 212 includes digit keys, 0 to 9, and function keys such as a Menu key, a Cancel (Clear) key, an OK key, a Talk key, an End key, an Internet key, and navigation keys (▲/▼/◄/►). The keypad 212 provides key input data corresponding to a key pressed by the user.

The CODEC 214 connected to the controller 200 and the microphone 216 and the speaker 218 connected to the CODEC 214 collectively form a voice input/output unit for voice communications. The CODEC 214 converts pulse code modulation (PCM) data received from the controller 200 to an analog voice signal and outputs the voice signal through the speaker 218. It also converts a voice signal received through the microphone 216 to PCM data and provides the PCM data to the controller 200.

Below, a description will be made of a method of selectively storing at least one of audio and video data in the video call-enabled mobile terminal having the above-described configuration with reference to FIGS. 3, 4 and 5.

Figure 3:
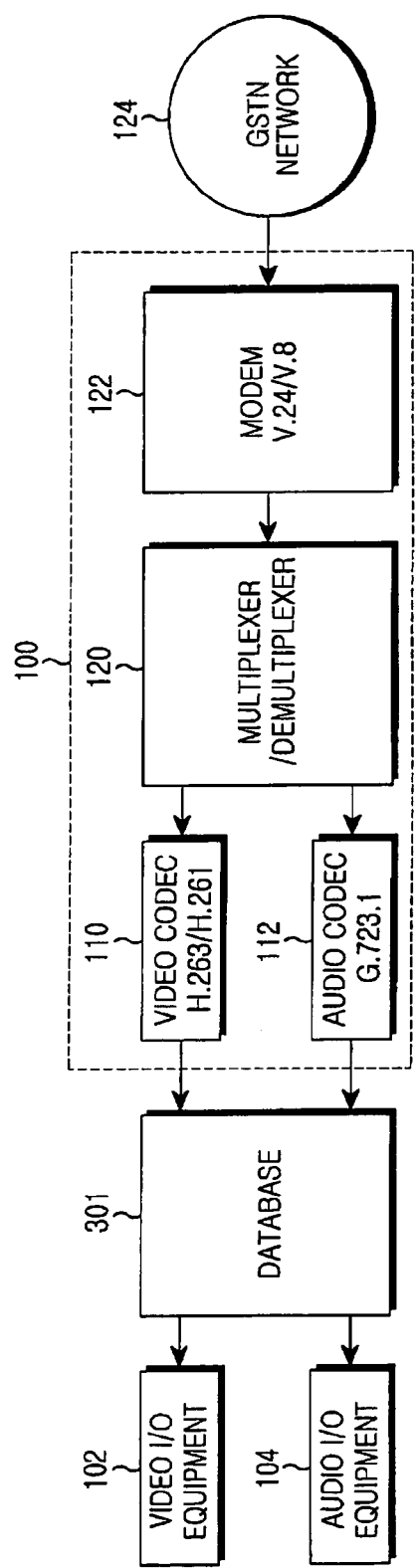
FIG. 3 is a diagram illustrating an operation for storing incoming audio and/or video data in the video call-enabled mobile terminal according to an embodiment of the present invention.

FIG. 3 is a diagram illustrating an operation for storing at least one of incoming audio and video data in the video call-enabled mobile terminal according to an embodiment of the present invention. For selective storing of at least one of incoming audio and video data during a video call, according to the H.324 standard, the multiplexer/demultiplexer 120 demultiplexes video call data received through the modem 122 into audio and video data and outputs the audio data to the audio CODEC 112 and the video data to the video CODEC 110. When the at least one of audio and video data is selected, the selected data is stored in a database 301 under the control of the controller 200. The video data is output to the display 202 corresponding to a video I/O equipment 102 and the audio data to the speaker 218 corresponding to an audio I/O equipment 104.

Figure 4:
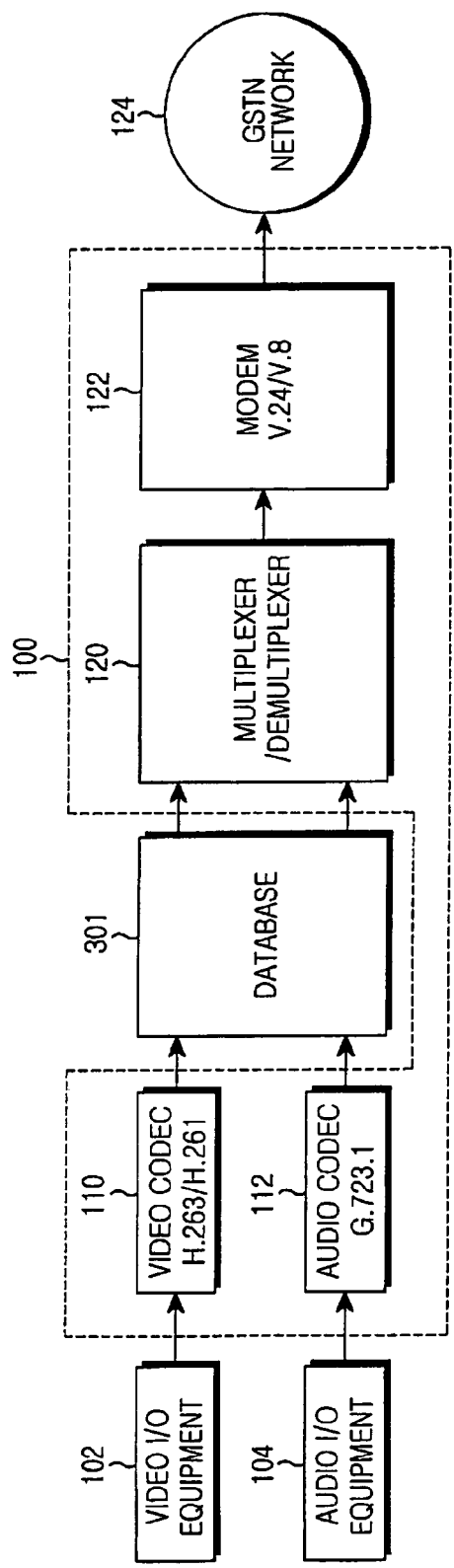
FIG. 4 is a diagram illustrating an operation for storing outgoing audio and video data in the video call-enabled mobile terminal according to an embodiment of the present invention.

FIG. 4 is a diagram illustrating an operation for storing outgoing at least one of audio and video data in the video call-enabled mobile terminal according to an embodiment of the present invention. The video CODEC 110 encodes video transmission data received from the camera 206 corresponding to the video I/O equipment 102, and the audio CODEC 112 encodes audio transmission data received from the microphone 218 corresponding to the audio I/O equipment 104. If the at least one of audio and video data is selected, the selected data is stored in the database 301 under the control of the controller 200. The multiplexer/demultiplexer 120 multiplexes the audio and video data to video call data and transmits the video call data through the modem 122.

Figure 5:
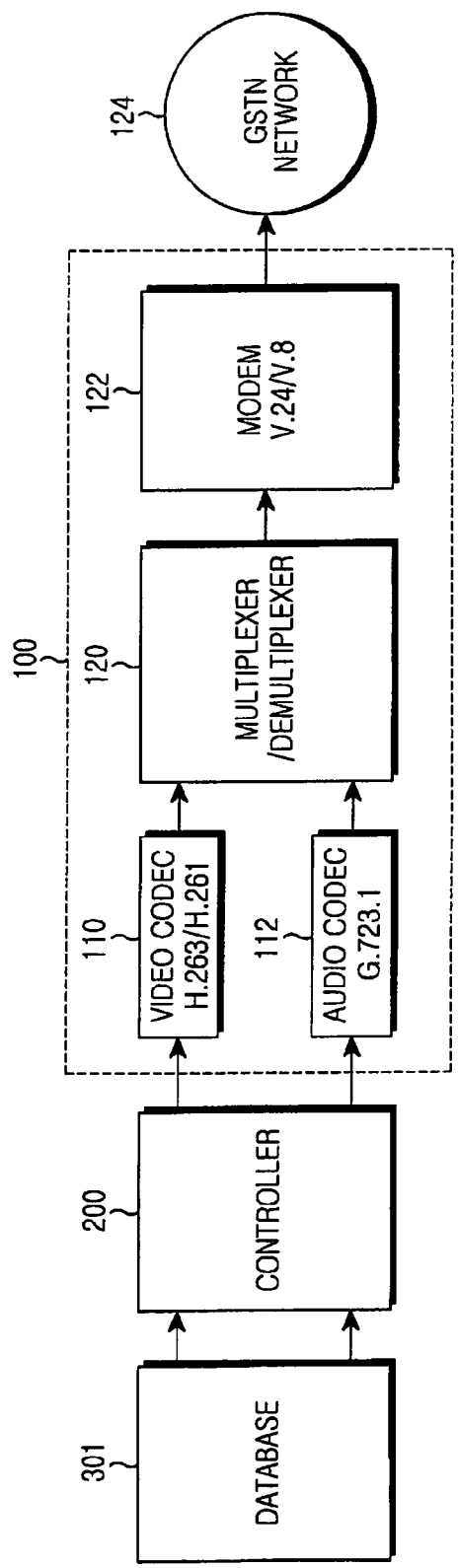
FIG. 5 is a diagram illustrating an operation for transmitting stored audio and video data in the video call-enabled mobile terminal according to an embodiment of the present invention.

FIG. 5 is a diagram illustrating an operation for transmitting stored audio and video data in the video call-enabled mobile terminal according to an embodiment of the present invention. Referring to FIG. 5, audio and video data stored in the database 301 is selected. The controller 200 determines whether the selected audio and video data can be transmitted according to the H.324 standard. If the H.324-based transmission is available, the video data is transmitted to the video CODEC 110, and the audio data is transmitted to the audio CODEC 112. The multiplexer/demultiplexer 120 multiplexes the audio and video data to video call data and transmits the video call data through the modem 122.

Figure 6:
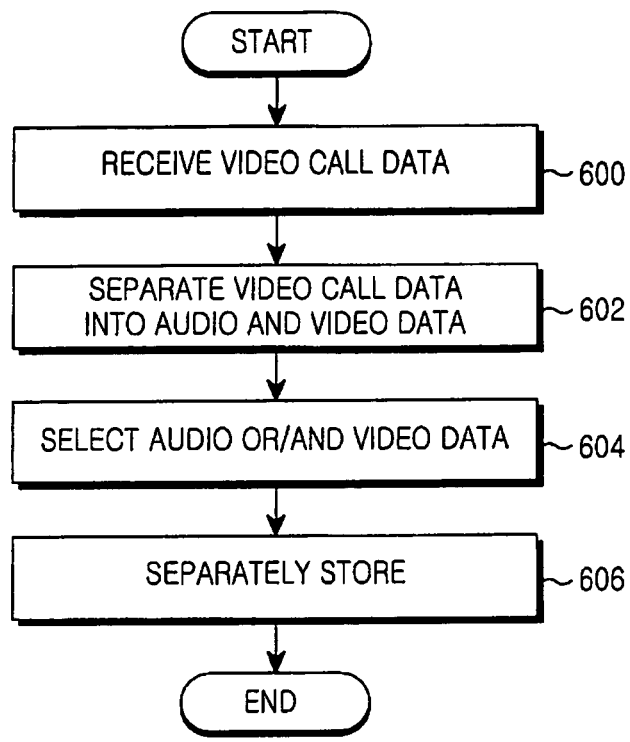
FIG. 6 is a flowchart illustrating an operation for selectively storing at least one of audio and video data according to an embodiment of the present invention.

FIG. 6 is a flowchart illustrating an operation for selectively storing audio and video data according to an embodiment of the present invention. Referring to FIG. 6, upon receipt of video call data in step 600, the video call data is separated into audio and video data in step 602. In step 604, the at least one of audio and video data is selected for storage. The selected at least one of audio and video data is stored separately in step 606.

Figure 7:
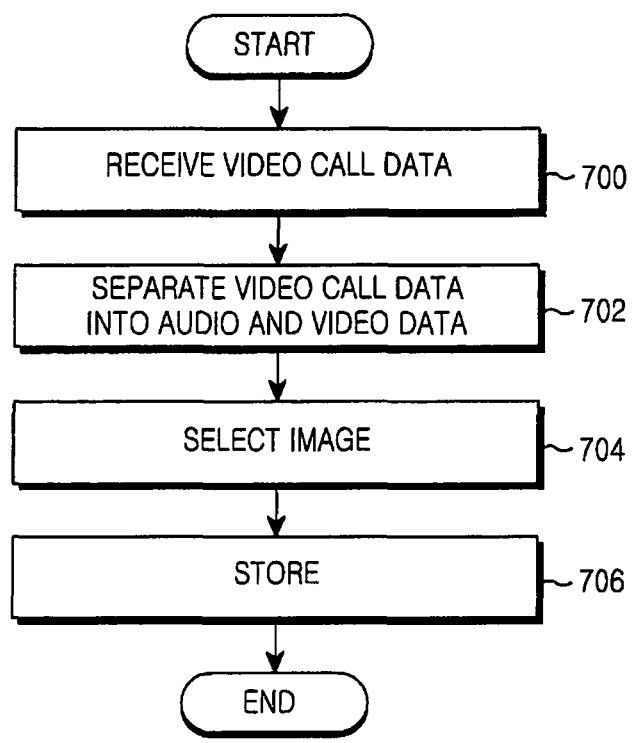
FIG. 7 is a flowchart illustrating an operation for storing image data in the video call-enabled mobile terminal according to an embodiment of the present invention.

FIG. 7 is a flowchart illustrating an operation for storing image data in the video call-enabled mobile terminal according to an embodiment of the present invention. Referring to FIG. 7, upon receipt of video call data in step 700, the video call data is separated into audio and video data in step 702. In step 704, an image is selected from the video data. The selected image is stored as image data in step 706.

Figure 8:
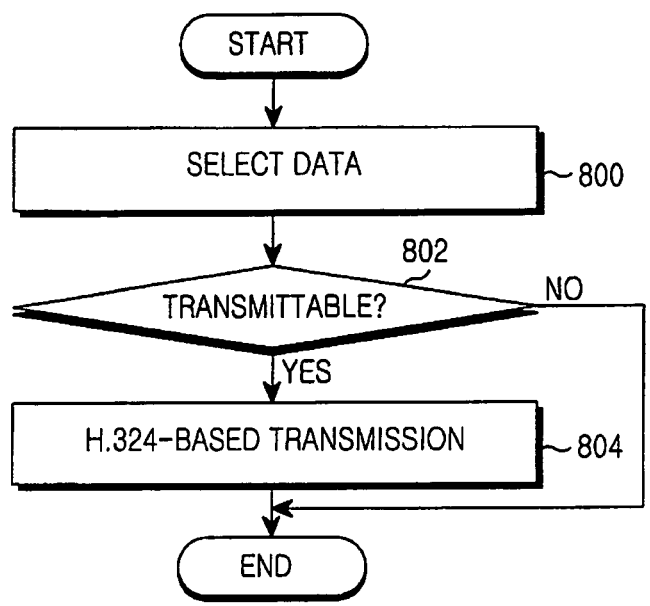
FIG. 8 is a flowchart illustrating an operation for selectively transmitting stored audio and video data in the video call-enabled mobile terminal according to an embodiment of the present invention.

FIG. 8 is a flowchart illustrating an operation for selectively transmitting stored audio and video data in the video call-enabled mobile terminal according to an embodiment of the present invention.

Referring to FIG. 8, upon selection of stored at least one of audio and video data in step 800, it is determined whether the selected data can be transmitted in compliance with H.324 in step 802. If H.324-based transmission is available, the selected data is transmitted in step 804. If H.324-based transmission is unavailable, the procedure ends.

As described above, the present invention allows selective storing of at least one of audio and video data at a video call, thereby saving resources for a video call-enabled mobile terminal and facilitating data amendment and editing.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A video call-enabled mobile terminal comprising:
   a controller for controlling separation of video call data into audio and video data and controlling separate storage of the separated audio data and the separated video data; and
   a memory for separately storing at least one of the separated audio and the separated video data under the control of the controller according to a selection of at least one of the separated audio and video data,
   wherein the memory stores only the selected data, the data being selected among the separated audio data and separated video data during a video call,
   wherein the controller determines whether a selected one of the separately stored audio and video data is transmittable according to a predetermined transmission protocol, and if the selected one of the separately stored audio and video data is transmittable according to the predetermined transmission protocol, controls transmission of the selected one of the separately stored audio and video data.

2. The video call-enabled mobile terminal of claim 1, wherein the controller receives a selection of an image from the separated video data controls storage of the selected image as image data.

3. A video call-enabled mobile terminal comprising:
   a controller for controlling separation of video call data into separated audio data and separated video data and receiving a selection of an image from the separated video data; and
   a memory for storing only the selected image as image data and the separated audio data and video data,
   wherein the controller determines whether a selected one of the audio and video data and image data is transmittable according to a predetermined transmission protocol, and if the selected one of the separately stored audio and video data is transmittable according to the predetermined transmission protocol, controls transmission of the selected one of the separately stored audio and video data.

4. The video call-enabled mobile terminal of claim 3, wherein the controller controls storing of an image captured from the video data as image data.

5. The video call-enabled mobile terminal of claim 3, wherein the controller determines whether the image of the video data is being stored the image of the video data is being stored can be transmitted, controls transmission of the image of the video data is being stored.

6. A method of separately storing audio and video data in a video call-enabled mobile terminal during a video call, comprising:
   receiving video call data;
   separating the received video call data into separated audio data and separated video data;
   receiving a selection of data from among the separated audio data and the separated video data;
   separately storing each of the selected audio and video data in a memory that stores only the separated audio and video data;
   receiving a selection of at least one of the separately stored audio data and video data;
   determining whether each of the selected one of the separately stored audio and video data is transmittable according to a predetermined transmission protocol; and
   transmitting the selected one of the separately stored audio and video data upon a determination that the selected at least one of the separately stored audio and video data is transmittable according to the predetermined transmission protocol.

7. A method of transmitting audio or video data stored separately in a video call-enabled mobile terminal, comprising:
   receiving a selection of one from among the separately stored audio data and the separately stored video data wherein the audio data and the video data are separated from video call data;
   storing the separated audio data and video data in a memory that stores only the separated audio data and video data; and
   transmitting the selected one upon a determination that the selected one is transmittable according to a predetermined transmission protocol.

8. A method of selectively storing audio or video data in a video call-enabled mobile terminal during a video call, comprising:
   receiving video call data;
   separating the video call data into separated audio data and separated video data;
   receiving a selection of at least one of the separated audio data and the separated video data;
   separately storing each of the selected data in a memory that stores only the separated audio data and video data;
   receiving a selection of one of the separately stored audio data and video data;
   determining whether the selected one of the separately stored audio and video data is transmittable according to a predetermined transmission protocol; and
   transmitting the selected at least one of the separately stored audio and video data upon a determination that the selected at least one of the separately stored audio and video data is transmittable according to the predetermined transmission protocol.

9. A method of transmitting at least one of separately stored audio data or video data in a video call-enabled mobile terminal, comprising the steps of:
   separately storing each of the audio data and video data in a memory that stores only the separated audio data and video data;
   receiving a selection of one of the separately stored audio data and video data as transmission data wherein the audio data and the video data are separated from video call data;
   determining whether each of the selected one of the data is transmittable according to a predetermined transmission protocol; and
   transmitting the selected transmission data upon the determination that the selected transmission data is transmittable according to the predetermined transmission protocol.

10. A video call-enabled mobile terminal comprising:
    a controller for controlling separation of video call data into audio data and video data;
    a memory for storing only the separated audio data and video data; and
    wherein the controller controls transmission of one of separated the audio data and the video data according to a predetermined transmission protocol.

11. The video call-enabled mobile terminal of claim 1, wherein the separation of the video call data into the audio data and the video data is performed during a video call.

12. A video call-enabled mobile terminal comprising:
a controller for controlling separation of video call data into separated audio data and separated video data and transforming a portion of the separated video data into an image data;
a memory for storing only the separated audio data and video data; and
wherein the controller controls transmission of the separated one of the audio data, the video data and the image data according to a predetermined transmission protocol.

13. The video call-enabled mobile terminal of claim 3, wherein the controller controls storing of the image data in the memory.

14. The video call-enabled mobile terminal of claim 1, wherein the separation of the video call data into the audio data and the video data is performed during a video call.

15. A method of transmitting audio or video data in a video call-enabled mobile terminal, comprising:
receiving video call data;
separating the received video call data into separated audio data and separated video data;
separately storing each of the audio data and video data in a memory that stores only the separated audio data and video data; and
transmitting one of the separated audio data and the separated video data according to a predetermined transmission protocol.

16. The method of transmitting audio and video data of claim 15, wherein the separation is performed during a video call.

17. The method of transmitting audio and video data of claim 15, wherein the controller controls storing of an image data transformed from a portion of the separated video data.

18. The method of transmitting audio and video data of claim 15, wherein the controller controls transmitting the image data.

19. A method of transmitting audio data or video data in a video call-enabled mobile terminal, comprising:
receiving a selection of one of separated audio data and video data as transmission data wherein the audio data and the video data are separated from video call data;
separately storing each of the audio data and video data in a memory that stores only the separated audio data and video data;
determining whether each of the selected one of the data is transmittable according to a predetermined transmission protocol; and
transmitting the selected transmission data upon a determination that the selected transmission data is transmittable according to the predetermined transmission protocol.

20. The method of transmitting audio and video data of claim 19, wherein the separation is performed during a video call.

21. A video call-enabled mobile terminal comprising:
a controller for controlling separation of video call data into audio and video data and controlling separate storage of the separated audio data and the separated video data; and
a memory for separately storing only the separated audio and the separated video data under the control of the controller,
wherein the separated audio data and the separated video data are from video-call data during a video call,
wherein the controller controls transmission of selected one of the separately stored audio and the separately stored video data upon a determination that the selected one among the separately stored audio and the separately video data is transmittable according to a predetermined transmission protocol.

* * * * *